US007341289B2

(12) United States Patent
Schretzlmeier et al.

(10) Patent No.: US 7,341,289 B2
(45) Date of Patent: Mar. 11, 2008

(54) EMERGENCY UNLOCKING SYSTEM FOR THE TRUNK OF A MOTOR VEHICLE

(75) Inventors: Werner Schretzlmeier, Erlenbach (DE); Marco Ikker, Offenau (DE); Sven Seidler, Neuenstadt (DE); Ralf Monnig, Neckarsulm (DE)

(73) Assignee: Audi AG, Federal Republic of Germany, Ingolstadt (DE)

( * ) Notice: Subject to any disclaimer, the term of this patent is extended or adjusted under 35 U.S.C. 154(b) by 0 days.

(21) Appl. No.: 11/429,979

(22) Filed: May 9, 2006

(65) Prior Publication Data

US 2006/0255595 A1 Nov. 16, 2006

(30) Foreign Application Priority Data

May 11, 2005 (DE) ..................... 10 2005 021 740

(51) Int. Cl.
*E05B 65/10* (2006.01)
*B62D 25/10* (2006.01)

(52) U.S. Cl. ........................................................ 292/92

(58) Field of Classification Search .................. 292/92, 292/93, DIG. 42, 216, 201, 144, DIG. 65; 296/146.4, 76

See application file for complete search history.

(56) References Cited

U.S. PATENT DOCUMENTS

| | | | | |
|---|---|---|---|---|
| 3,905,624 | A * | 9/1975 | Fujita | 292/11 |
| 5,263,347 | A * | 11/1993 | Allbaugh et al. | 70/257 |
| 5,445,421 | A * | 8/1995 | Ferrara | 292/216 |
| 5,526,710 | A * | 6/1996 | Ohta | 74/89 |
| 6,394,511 | B1 * | 5/2002 | Lam et al. | 292/336.3 |
| 6,485,071 | B2 * | 11/2002 | Schwaiger | 292/216 |
| 6,485,081 | B1 * | 11/2002 | Bingle et al. | 296/76 |
| 6,527,313 | B2 * | 3/2003 | Takahashi et al. | 292/336.3 |
| 2004/0239139 | A1 * | 12/2004 | Haunstetter | 296/76 |
| 2005/0099037 | A1 * | 5/2005 | Kitoh | 296/223 |

FOREIGN PATENT DOCUMENTS

| | | |
|---|---|---|
| DE | 41 06 734 | 7/1992 |
| DE | 198 35 821 | 2/2000 |
| DE | 102 24 076 | 12/2003 |
| DE | 10224076 A1 * | 12/2003 |

* cited by examiner

OTHER PUBLICATIONS

Child Passenger Safety, Tech Report; Apr. 2001; p. 1; National Highway Traffic Safety Administration.

*Primary Examiner*—Jennifer H. Gay
*Assistant Examiner*—Alyson Merlino
(74) *Attorney, Agent, or Firm*—Stevens, Davis, Miller & Mosher, LLP

(57) ABSTRACT

This invention relates to an emergency unlocking system for a motor vehicle trunk (2), with a trunk lock (6) which comprises at least one lock latch (7) and an interacting locking part (8), with a catch means (14) which limits the trunk opening motion and which comprises a catch hook (15) which can be actuated from outside the trunk (2) and an interacting catch hook engagement element (16) for canceling the motion limitation, and with an emergency unlocking means (20) which is located in the trunk (2) and which acts to open the trunk lock (6) and to release the catch means (14) when actuated. In order to offer an increased safety standard with a simple structure and to meet safety stipulations with respect to the speed-dependent allowability of emergency unlocking, the actions applied by the emergency unlocking means (20) to the trunk lock (6) and the catch means (14) are decoupled from one another.

16 Claims, 2 Drawing Sheets

EMERGENCY UNLOCKING SYSTEM FOR THE TRUNK OF A MOTOR VEHICLE

Figure 1:
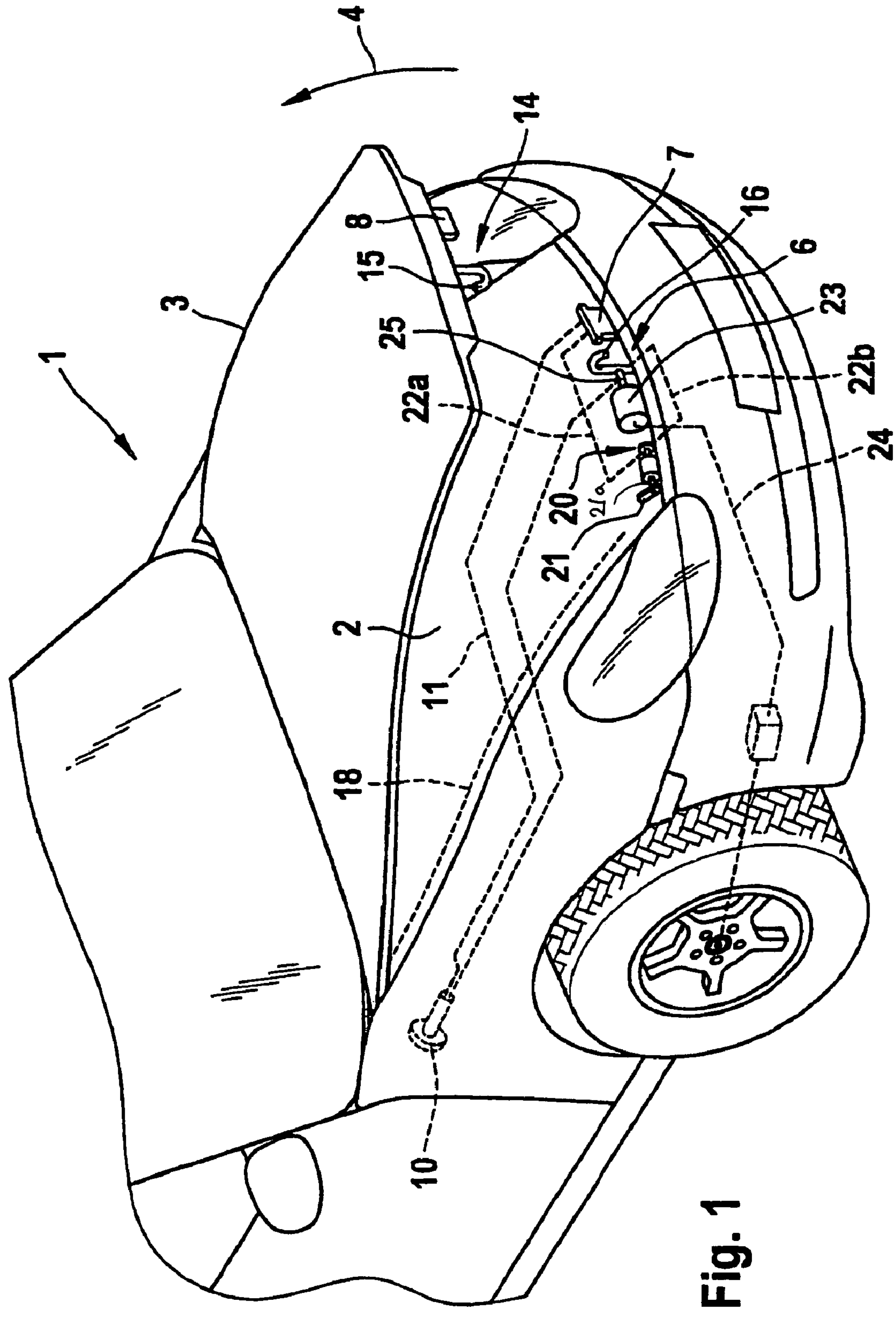

This application claims priority from DE 102005021740.0, filed May 11, 2005.

The invention lies within the field of locking systems for a trunk of a motor vehicle. Such locking systems having interacting locking and safety elements conventionally mounted on the body of the vehicle and on the trunk lid. The invention relates to an emergency unlocking system for a motor vehicle trunk.

Such systems must reliably meet increasingly more demanding specifications relating to safety aspects and safety regulations. Recent regulations, such as the provisions pertaining to trunk interior activation as set forth in the regulation "Internal Trunk Release FMVSS 401" which entered into force in the United States on Sep. 1, 2001, for the especially high-turnover vehicle market, require among other specifications an emergency trunk unlocking system whereby a person trapped in the trunk can free himself by actuating an emergency actuation element.

According to the definition underlying this regulation, a trunk is a space which

- is designed for carrying baggage or cargo,
- is separated from the driver's or passenger compartment by a partition or by a stationary or folding row of seats,
- can be closed to the outside by a trunk lid and
- has an interior space size which can hold a dummy of a three-year old child with the trunk lid closed and locked.

In motor vehicles in which for construction reasons, for example due to the arrangement of the engine in the vehicle rear, the trunk is located in the front, therefore under a front lid, according to the initially named regulation the following specifications must be observed:

- When driving forward at a speed of 5 km/h or more the trunk lid must be prevented from opening wider by a secondary safety means, for example of a catch element, with improper or unintentional unlocking of the trunk lock.
- When driving forward at a speed of less than 5 km/h, when the emergency unlocking means is actuated, the trunk lid must unlock. Moreover at these speeds it is allowable for the emergency unlocking means to act to release the catch means in order to allow wider opening of the trunk lid,
- When parked, when the emergency unlocking means is actuated, an unhindered opening of the trunk lid must be ensured.

German patent application DE 102 24 976 A1 discloses an emergency unlocking system for a motor vehicle body-side lock latch and an interacting locking part on the trunk lid. After unlocking the trunk lock, a catch means limits the further opening motion of the trunk lid in order to prevent uncontrolled further opening of the trunk lid for improper or unintentional unlocking (opening) of the trunk lock. To limit this motion, a pivotable catch hook mounted on the trunk lid and a corresponding stationary catch hook support are used. The latter is also called the catch hook engagement element within the framework of this invention. Behind the catch hook support the catch hook interlocks after only a small movement of the trunk lid in the opening direction. In order to completely open the trunk lid, the catch hook must be disengaged from the catch hook support against the pretensioning force of a hook spring by a release element which can be actuated outside the vehicle.

A T-shaped emergency control component is mounted in the trunk so as to be pivotable about a pivot axle and to be able to act on the stop element of the catch hook in order to pivot the catch hook and so disengage it from the catch hook engagement element. Two Bowden cables may be actuated as a couple in emergency situations by an emergency actuating element. When so actuated, one Bowden cable opens the trunk lock, while the other Bowden cable, which is simultaneously the emergency control component, acts on the stop element of the catch hook and as a result disengages the catch hook from the catch hook engagement element. Thus any person trapped in the trunk with the trunk lid closed can free himself from this dangerous situation through a one-time operation of the emergency actuation element.

With this known emergency unlocking means however not all the initially mentioned regulations and specifications can be satisfied. In particular there is a major hazard when a front trunk lid is opened while driving.

Against this background the object of this invention is to devise an emergency unlocking system for a motor vehicle trunk which offers an increased safety standard with a simple structure and especially satisfies the initially described stipulations.

This object is achieved by an emergency unlocking system with the following features: at least one lock latch and one interacting locking part, a catch means which limits a trunk opening motion and comprises a catch hook which can be actuated from outside the trunk and an interacting catch hook engagement element for canceling the motion limitation, and an emergency unlocking means located in the trunk, and acts to open the trunk lock and to release the catch means when actuated, wherein the actions applied by the emergency unlocking means to the trunk lock and the catch means are decoupled from one another.

Accordingly, for the locking system as claimed in the invention the actions of the emergency unlocking means applied to the trunk lock and catch means are decoupled from one another.

The idea underlying this invention is among others to provide decoupling in the emergency actuation of the trunk lock and the catch means in order in this way to control the opening motion of the trunk lid appropriately to the circumstances with monitoring of a speed-dependent actuating element.

In this way it is possible to provide for complete opening of the trunk lid, not necessarily in each case when the emergency unlocking means is operated, but to make it dependent on additional safety criteria, especially an allowable maximum speed of the vehicle.

Advantageous embodiments and development of the invention are described herein with reference to the drawings.

According to one especially preferred development, there is a speed-dependent actuating element which above a defined or definable reference speed stops the releasing action of the emergency unlocking means on the catch means. In particular, the actuating element can directly encompasses a speedometer and/or can tap the speed values which are determined in any case by a vehicle-side sensor and which are also electronically or mechanically relayed for example to the vehicle tachometer. Decoupling of the actuation from the trunk lock and catch means can take place by separate activation for example by successive switch positions or positions of an unlocking handpiece, unlocking lever or the like.

One mechanically preferred configuration of the invention calls for the actuating element to act mechanically on the catch means. Thus the actuating element can act especially preferably by means of a slide or an actuating lever directly on the catch hook and/or on the catch hook engagement element.

According to one especially preferred mechanical development of the invention the catch hook engagement element is made to be movable and the emergency unlocking means is moved (if released by the actuating element) when the catch hook engagement element is actuated such that its motion-limiting action on the catch hook is cancelled.

The catch hook engagement element can preferably be pivoted out of engagement with the catch hook.

The catch hook engagement element can preferably be a pin or clip located on the pivoting lever as an assembly that can be produced and mounted especially easily.

Figure 2:
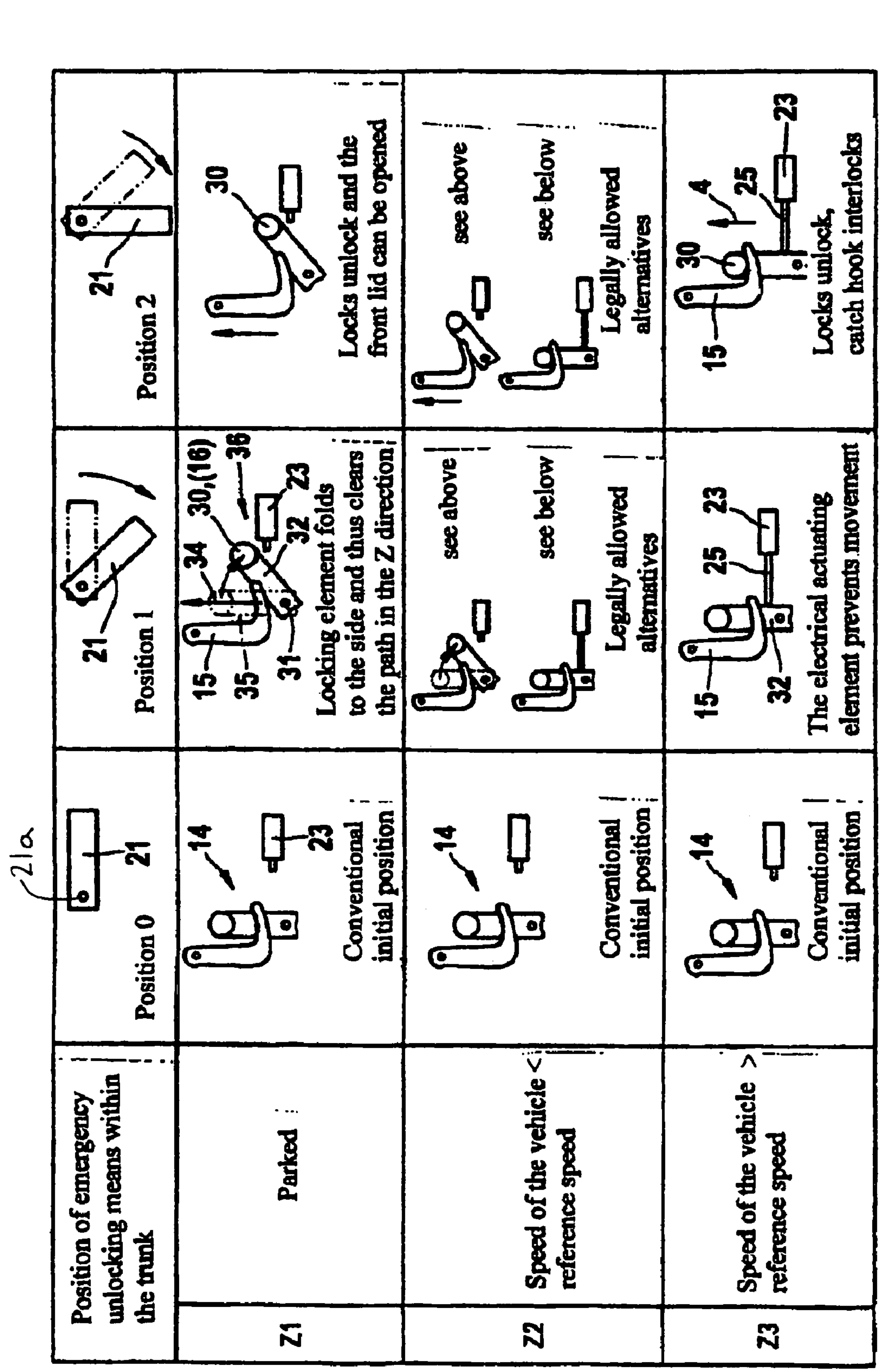

The invention is discussed below in greater detail with reference to the preferred embodiments shown in the accompanying drawings, in which FIG. 1 schematically shows the structure of the unlocking system of the invention and FIG. 2 shows an outline of the unlocking system in different actuating states and its situation-dependent actions.

The same and functionally identical components, if not otherwise indicated, have been provided with the same reference numbers in the figures.

FIG. 1 schematically shows the structure of the unlocking system of the invention. FIG. 1 shows a trunk 2 which is made in the front of a vehicle 1 with a trunk lid 3 which in the conventional manner can be pivoted up in the direction of the arrow 4 into the completely opened position.

The trunk lid 3 in the closed state is locked by a trunk lock 6 which comprises at least one vehicle-side lock latch 7 and a lid-side interacting locking part 8.

For conventional unlocking of the trunk lock there is an unlocking means 10 which can be operated from the passenger compartment. It conventionally comprises a Bowden cable 11 which leads to the lock latch 7 and unlocks it when the unlocking means is actuated—i.e. disengages it from the locking part 8.

Furthermore, there is a catch means 14 which limits the trunk opening motion after unlocking the trunk lock 6 and which comprises a catch hook 15 and an interacting catch hook element 16. The catch hook interlocks behind the catch hook engagement element and in this way first of all prevents further opening of the trunk lid which goes beyond the initial opening indicated in the broken outline 18. To cancel the motion limitation, the catch hook can be actuated from outside the trunk, for example via a conventional, spring-pretensioned actuating rocker which is not detailed, which is located underneath the trunk lid and can be pressed down, and which in doing so acts to release the catch means.

There is furthermore an emergency unlocking means 20 with an emergency actuating element 21 in the trunk, so that a person trapped in the trunk can free himself by manually actuating the emergency actuating element 21, which emergency actuating element 21 can act on the emergency unlocking means 20 via pin 21*a*. That is to say, e.g., rotation of the emergency actuating element 21 (as shown in FIG. 2) can also rotate pin 21*a*, which causes a force to be applied to the emergency unlocking means. The emergency unlocking means 21 acts to release the catch means and to open the trunk lock when actuated. To do this, it can act on the trunk lock in the same way as described above in conjunction with the unlocking means 10. Thus, the lock latch 7 can be accordingly unlocked via a Bowden cable 22*a* when the emergency actuating element 21 is actuated. Thus, actuation of the emergency actuating element 21 acts upon lock latch 7 (via Bowden cable 22*a*) in the same manner as unlocking means 10 acts upon lock latch 7 (via Bowden cable 11). At the same time the emergency unlocking means 21 acts to release the catch hook engagement element 16 via another, but decoupled Bowden cable 22*b* by trying to disengage it from the catch hook. This however only succeeds when this motion—as described above in detail—is not stopped by a speed-dependent actuating element 23.

The speed-dependent actuating element 23 is supplied with the values 24 of the current vehicle speed that are tapped for example from a sensor on the front wheel. If they exceed a threshold value which corresponds to a reference speed, the actuating element 23 activates a blocking lever 25, is detailed below.

To further illustrate the action of the emergency unlocking means, reference is made to FIG. 2. It shows an outline of different speed situations of the vehicle with regard to the respective action of the emergency unlocking means of the invention. Conceivable vehicle movements and the assigned operating situations of the locking system are cited for this action.

The first situation line Z1 relates to the vehicle at rest ("Parked"), the second situation line Z2 relates to a vehicle speed below a given maximum speed which is also called the reference speed ("speed of the vehicle<reference speed") and the third and last line Z3 relates to the vehicle speed above a given maximum speed ("speed of the vehicle>reference speed"). In the uppermost line the corresponding positions of the emergency actuating element 21 which is made for example as an emergency lever are shown. The system is tailored for example to the initially outlined regulations of the US market, decoupling of the actions of the emergency unlocking means on the trunk lock and the catch means of course also allowing other modifications.

The first column shows for the 3 different speed states of the vehicle the corresponding situations without actuation of the emergency actuation element 21 (lever in "position 0"). Here the trunk lid is in the closed position in which the latch 7 and the locking part 8 (FIG. 1) are in the locked engagement. The catch means is not active in this regard.

If at this point the emergency actuation element 21 is actuated, which is indicated in the second column by the lever moving into "position 1", a force transmitted by the Bowden cable 22*b* (FIG. 1) is applied to the catch hook engagement element 16 of the emergency unlocking means, which former is mounted on a pivoting lever 32 which can be swiveled around an axis 31 of rotation and which is made as a pin 30. This force pivots the catch hook engagement element out of a position 35 which lies in the swivel path 34 of the catch hook 15 as the trunk lid continues to open (shown by the broken line in FIG. 2) into an enabling position 36 which releases the catch action.

But if the actual speed of the vehicle at this instant is greater than the given reference speed of for example 5 km/h, the speed-dependent actuating element 23 takes effect (line Z3). By the action of its blocking lever 25 on the pivoting lever 32 this prevents the pivoting lever from being able to pivot out of the path of the catch hook 15 (column 2/"position 1"). In other words: In spite of actuating the emergency unlocking means the catch hook engagement element remains in the position which the catch hook engages when the trunk lid is opened (unlocked) and prevents further opening of the trunk lid.

These consequences are summarized in the last column of FIG. 2 in which the emergency actuation element is moved into the position (position 2") in which the trunk lock is unlocked. According to line Z1 "Parked", complete opening of the trunk lid is accomplished because the catch hook moves past the catch hook engagement element which has been swiveled out of its path of motion without collision and thus the emergency unlocking means acts entirely to open the described locking and safety system.

If however the current speed of the vehicle is greater than the given reference speed (line Z3), as a result of the position of the emergency actuating element the trunk lock unlocks and the trunk lid moves first in the opening direction of the arrow 4. This motion however ends after a very short path, because as described above the actuating element 23 acts to hinder the pivoting motion of the catch hook engagement element 30. In this way the catch hook engagement element further remains in the speed range in which the reference speed is not exceeded (line Z2), at least the initially explained stipulation leaves it to the user to choose whether to intervene to hinder the releasing pivoting motion of the catch hook engagement element or not. In other words: Here for example depending on the specific manufacturer specifications two system configurations can be alternatively implemented. If at the lowest vehicle speed is it desired that emergency unlocking be stopped, the system should be configured according to line Z3. In this case, the actuating element for each speed value different from 0 km/h would prevent release of the catch means 14 via the blocking lever 25. Accordingly of course threshold values other than the value of 5 km/h mentioned as an example can also be chosen.

With this invention therefore an emergency unlocking means can be individually configured which satisfies increased safety demands and in which still the components necessary for emergency unlocking can be made mechanically simple and can be produced and installed economically.

Although this invention was described above using preferred exemplary embodiments, it is not limited thereto, but can be modified in diverse ways.

The invention claimed is:

1. An emergency unlocking system for a motor vehicle trunk comprising:
- a trunk lock, comprising at least one lock latch and one interacting locking part,
- a catch means which limits a trunk opening motion and comprises a catch hook which can be actuated from outside the trunk and an interacting catch hook engagement element for canceling the motion limitation, and
- an emergency unlocking means located in the trunk adapted to be actuated by a person inside the trunk, and acts to open the trunk lock and to release the catch means when actuated,
- wherein the actions applied by the emergency unlocking means to the trunk lock and the catch means are decoupled from one another.

2. The unlocking system as claimed in claim 1, further comprising a speed-dependent actuating element which above a defined or definable reference speed stops the releasing action of the emergency unlocking means on the catch means.

3. The unlocking system of claim 1, wherein the actuating element acts mechanically on the catch means.

4. The unlocking system as claimed in claim 1, wherein the catch hook engagement element is made to be movable and wherein the emergency unlocking means is moved when the catch hook engagement element is actuated such that its motion-limiting action on the catch hook is cancelled.

5. The unlocking system as claimed in claim 4, wherein the catch hook engagement element can be pivoted to disengage from the catch hook.

6. The unlocking system as claimed in claim 1, wherein the catch hook engagement element is a pin or clip located on a pivoting lever.

7. The unlocking system of claim 2, wherein the actuating element acts mechanically on the catch means.

8. The unlocking system as claimed in claim 7, wherein the catch hook engagement element is made to be movable and wherein the emergency unlocking means is moved when the catch hook engagement element is actuated such that its motion-limiting action on the catch hook is cancelled.

9. The unlocking system as claimed in claim 7, wherein the catch hook engagement element is a pin or clip located on a pivoting lever.

10. The unlocking system as claimed in claim 2, wherein the catch hook engagement element is made to be movable and wherein the emergency unlocking means is moved when the catch hook engagement element is actuated such that its motion-limiting action on the catch hook is cancelled.

11. The unlocking system as claimed in claim 3, wherein the catch hook engagement element is made to be movable and wherein the emergency unlocking means is moved when the catch hook engagement element is actuated such that its motion-limiting action on the catch hook is cancelled.

12. The unlocking system as claimed in claim 2, wherein the catch hook engagement element is a pin or clip located on a pivoting lever.

13. A method of preventing unlocking of a motor vehicle trunk comprising:
- measuring a speed of the vehicle;
- preventing opening of an unlocking system when the speed of the vehicle is greater than a reference speed, the unlocking system comprising:
  - a trunk lock comprising a lock latch and an interacting part, and
  - an emergency unlocking means located in the trunk to be actuated by a person inside the trunk,
- wherein activation of the emergency locking means acts to disengage the trunk lock when actuated, and the speed of the vehicle is less than the reference speed wherein the unlocking system further comprises a catch means and an interacting catch hook engagement, decoupled from the trunk lock, for limiting movement of the trunk when the trunk lock is disengaged.

14. The method of claim 13, wherein activation of the emergency locking means acts to disengage the catch means from the interacting catch hook engagement when the speed is less than the reference speed.

15. The method of claim 13, further comprising actuating a speed-dependent actuating element when the speed of the vehicle is greater than the reference speed, such that the speed-dependent actuating element stops the disengagement of the trunk lock.

16. An emergency unlocking system for a motor vehicle trunk comprising:
- a trunk lock, comprising a lock latch and an interacting part;
- an open-motion limiting means, comprising a catch hook and an interacting catch hook element, wherein the open-motion limiting means is decoupled from the trunk lock;
- an unlocking means for unlocking the trunk lock; and
- a speed-dependent actuating element, positioned to prohibit disengagement of the trunk lock and/or the open-motion limiting means in response to a speed detected for the vehicle being greater than a reference speed.

* * * * *